(No Model.)
C. HOFF.
APPARATUS FOR FILTERING BEER, WINE, &c.
No. 601,300. Patented Mar. 29, 1898.
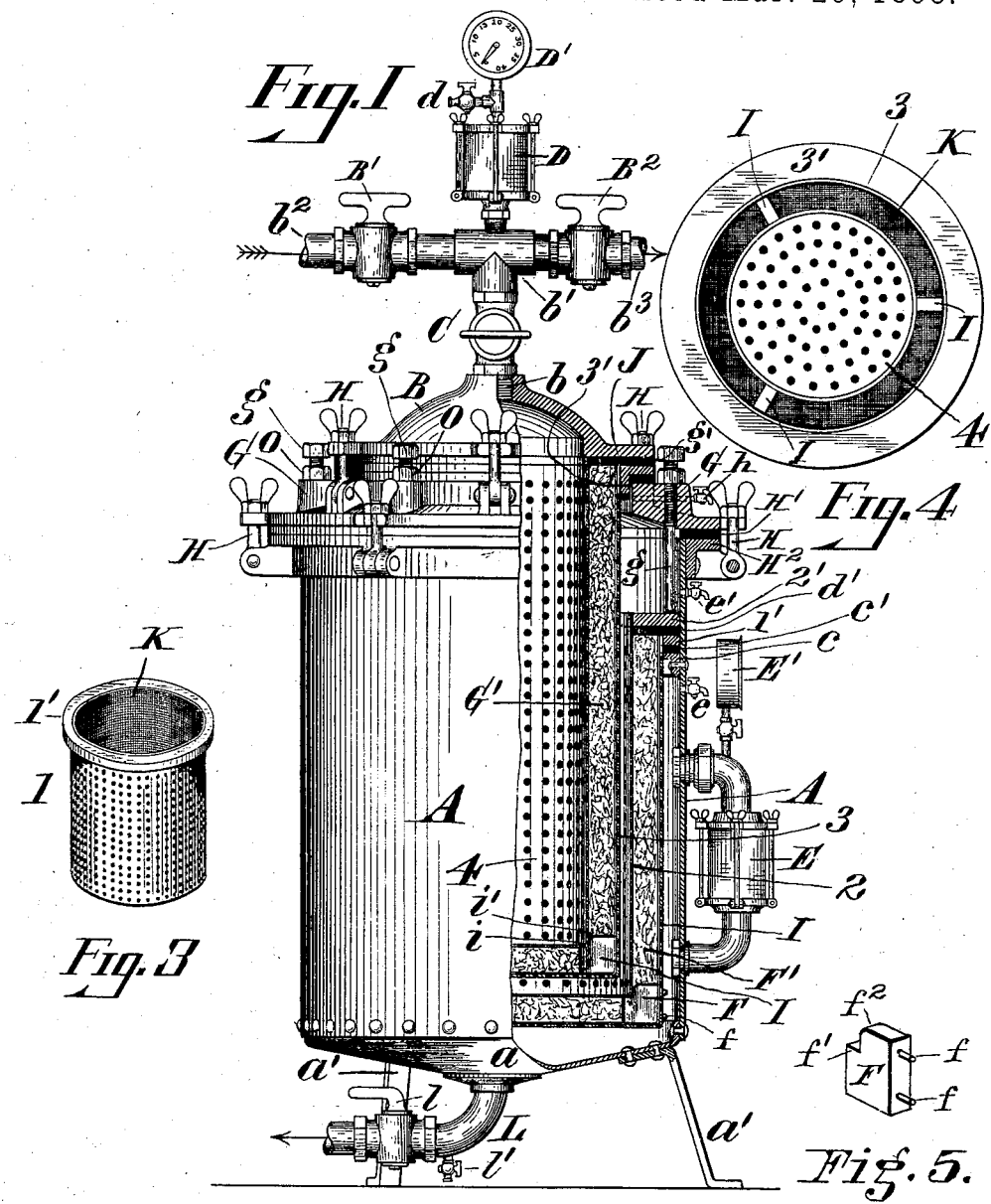
WITNESSES
Sherwood R. Taylor
L. M. Jones
INVENTOR
Charles Hoff,
by John E. Jones
his attorney.

UNITED STATES PATENT OFFICE.

CHARLES HOFF, OF CINCINNATI, OHIO, ASSIGNOR OF ONE-HALF TO ALBERT H. SCHUMACHER, OF SAME PLACE.

APPARATUS FOR FILTERING BEER, WINE, &c.

SPECIFICATION forming part of Letters Patent No. 601,300, dated March 29, 1898.

Application filed June 5, 1897. Serial No. 639,512. (No model.)

*To all whom it may concern:*

Be it known that I, CHARLES HOFF, a citizen of the United States, residing at Cincinnati, in the county of Hamilton and State of Ohio, have invented a certain new and useful Improvement in Apparatus for Filtering Beer, Wine, &c., of which the following is a specification.

My invention relates to an improvement in apparatus for filtering beer, wine, and the like; and it consists in the novel features of construction and combination of parts, such as are hereinafter fully described, and particularly pointed out in the claims.

In the accompanying drawings, Figure 1 is a front elevation, partly broken open and in central section, of the filter embodying my invention; Fig. 2, a broken central sectional elevation of the outermost or last two of my internal concentric strainer-cylinders, showing a detachable guard-funnel attachment thereon for use in conveniently filling the annulus between them with the filtering material; Fig. 3, a perspective view, on a smaller scale, of the lowermost and last in succession of the internal strainer-cylinders seen in Fig. 1, also seen in Fig. 2; Fig. 4, a plan view of the two innermost strainer-cylinders; and Fig. 5, a detail perspective view of one of the resting guide-blocks for the internal cylinders, showing it as it appears before attaching in place.

A represents the outer casing or shell, forming a cylindrical vessel for containing and supporting the filtering apparatus; $a$, the dished bottom thereof; $a'$, legs on which the vessel is supported above the floor with a suitable space intervening; and B a lid or dome-shaped cover having a central screw-threaded orifice $b$.

C represents a vertically-arranged inlet valve or cock having threaded nipples at each end of its shell, the lower nipple engaging the threaded orifice $b$ in the cover B and the upper nipple engaging the vertical branch of a T-coupling $b'$, and the latter in turn being engaged at its opposite horizontal ends by inlet-pipe $b^2$ and flushing-pipe $b^3$, respectively.

B' and B² represent controlling valves or cocks in said pipes $b^2$ and $b^3$, respectively.

D represents an upright transparent glass gage surmounting and communicating with the interior of T-coupling $b'$, and having in turn a pressure-gage D' surmounting it, which pressure-gage is provided with an air or pet cock $d$.

E represents a transparent glass gage mounted on the side of the shell A at or near its lower end and duly communicating with the interior of the latter.

E' is a pressure-gage surmounting the gage E, and $e$ and $e'$ represent several petcocks on the said shell at different levels above the glass gage E, communicating with several of the internal chambers.

1, 2, 3, and 4, respectively, represent each one of a series of telescopically-arranged perforated upright strainer-cylinders concentrically mounted within the casing or shell A. The cylinder 1 is provided with a top flange 1' and is supported above and clear of the bottom $a$ by means of a flanged ring $c$, which is suitably secured to the inner face of the shell just above the level of petcock $e$, said flange 1' resting on the ring $c$, with a rubber gasket or washer $c'$ intervening to make a close joint. An annulus or open space of due proportions is provided between the strainer-cylinder 1 and the outer shell. The cylinder 2 also has a top flange 2' and is duly supported above and clear of the perforated bottom of cylinder 1, with its said top flange resting partially on the top of said cylinder 1, with a rubber gasket $d'$ intervening and with the periphery of its perforated bottom resting on three or more shouldered blocks F, radially mounted at suitable intervals apart in the angle at the bottom of said cylinder 1. Blocks F are made with pins or projections $f$, which are passed through holes in the cylinder and upset or riveted on the outer side. These blocks positively insure the centering of the lower end of cylinder 2, which readily and firmly rests in the shoulders $f'$ thereof, round corners $f^2$ being constructed thereon to facilitate the dropping of the cylinder into place. These blocks also prevent any possible vibration or lateral displacement or movement out of line of said cylinder 2 and raise the bottom thereof the desired distance above that of the surrounding cylinder 1. A suitable space or annulus is provided between cylinders 1 and 2, in which a filling of wood-pulp or other desired filtering material F' is placed, as is also a similar continuous filling in the space between the perforated bottoms of cylinders 1 and 2.

G is a flange or ring surmounting the shell A and carrying the cap or cover B, vertical set-screws $g$ being provided therein, whose lower ends bear upon the top flange 2' of cylinder 2 to firmly hold said cylinder down and make a tight joint under said top flange 2'. Flange G and cap B are each detachably secured in place by means of swinging or pivotal bolts H, and a gasket H' intervenes between said flange G and a flanged ring $H^2$, secured at the upper end of shell A to effect an absolutely tight joint. A petcock $h$ is provided in ring or flange G, leading to the upper part of the innermost central chamber of the filter.

The cylinder 3 is provided with an angular ring or top flange 3', which latter rests on the ring or flange G, with a gasket $g'$ intervening, and a narrow space or annulus is provided between it and the cylinder 2 and a narrow space, too, between the perforated bottoms of the two cylinders.

The innermost cylinder 4 is supported and centered by means of blocks I in cylinder 3, which blocks are constructed with shoulders $i$, round corners $i'$, and radially mounted and fastened like unto the blocks F above described. A broad annulus is provided between the cylinders 3 and 4 and a broad space between their respective perforated bottoms to receive a filling of wood-pulp or other desired filtering material G', similar to that in the annulus or space between the cylinders 1 and 2. A broad gasket or flat rubber ring J intervenes between the cover B above and partially over the pulp G' and over the cylinder-flange 3' below to provide a tight joint. Gaskets $d'$ and J are both narrowed up to permit the air-pressure and liquid to pass down into the pulp from above and thereby properly and quickly set or pack it and also augment the filtering operation, and it will be seen that each cylinder is preferably made solid quite a distance down from its upper end, so that no beer or other liquid passing through the filter shall escape without properly passing through the perforations in the several internal cylinders and the pulp or filtering material hereinbefore mentioned. Cylinders 1 and 3 each have an internal lining of fine gauze wire-cloth K in both bottom and sides, whereby the pulp is effectually held compact and prevented from oozing or escaping through the perforations in said cylinders under the forward and down pressure of the liquid passing therethrough.

L represents an outlet-pipe leading from the bottom $a$ of the shell and having a controlling valve or cock $l$. An auxiliary pet or drain cock $l'$ is provided in said outlet-pipe L, whereby the filter may be relieved of pressure or drained at any time, if desired, without passing the liquid through the valve $l$.

In Fig. 2 I show a convenient device whereby the annuluses between cylinders 1 and 2 may be readily filled with pulp or filtering material, and this device is composed of a detachable funnel or hopper M, whose lower perpendicular portion $m$ fits within the upper end of cylinder 1, and a detachable conical hood N, whose lower perpendicular portion $n$ encircles the upper end of cylinder 2. The hood N forms a good cap or cover over the said cylinder 2 to prevent the entrance of the pulp into the annulus or space between cylinders 2 and 3, and thereby expedites and facilitates the pulp-filling operation, as does also said funnel M. A similar funnel and hood of smaller diameter, however, are used in filling the annulus between the cylinders 3 and 4. In making the pulp fillings the pulp is easily tamped or packed down into place by means of any suitable tamping-tool, the fillings between the cylinders 3 and 4 being gently tamped and those between cylinders 1 and 2 being more forcibly or tightly tamped or packed, whereby the liquid may pass more freely through the filtering medium between cylinders 3 and 4 and a greater resistance offered by the filtering medium between cylinders 1 and 2, thus insuring a quick and perfect filtering and cleansing of the liquid passing through the device.

In the operation of my filter, say for use in filtering beer, the parts being duly assembled and tightly held and clamped together, as seen in Fig. 1, the cocks B' and $B^2$ are opened to permit the first beer from the cask to fore shoot or flush through the pipe $b^3$ to a convenient clean receptacle or tub. During this flushing operation, which need not amount to the passage of more than four or five gallons into the said tub, (where the beer is not wasted,) the inlet-cock C, leading to the filter, remains closed. The flushing operation having been completed, the cock $B^2$ is closed and the inlet-cock C opened, thereby shunting the beer into the large central chamber of the filter, where it freely enters at the top both by gravity and under pressure from the cask. The beer in filtering then passes from said large central chamber through the perforated sides and bottom of the innermost cylinder 4, thence through the pulp or filtering medium G' packed in the space between cylinders 3 and 4, thence through the gauze wire-cloth lined perforated sides and bottom of cylinder 3 into the space or chamber lying between cylinders 2 and 3, thence through the perforated sides and bottom of cylinder 2 into and through the more tightly packed pulp or filtering medium F' in the space between cylinders 1 and 2, thence through the gauze wire-cloth lined perforated sides and bottom of cylinder 1 into the space or chamber between said cylinder 1 and the casing or shell A, and thence downward through the now open-valved outlet-pipe L, leading from the bottom $a$ to the barrel or keg to be filled.

Before the beer can pass freely through the filter without foaming or the like the several petcocks on the side of the casing and on the upper gage are all opened in turn to permit any undue air in the several chambers to escape. The transparent glass gages D and E permit the ready inspection of the beer as it passes into and through the filter, the upper one D indicating its unfiltered and dense condition on entering, and the lower one E indicating its clean, glossy, and clear condition after passing all the filtering-barriers and ready to discharge from the filter into the receiving barrels or kegs for the market or for use. The coarser filterings are retained principally in the central chamber and the pulp filling G', said central chamber being large and clear throughout from the bottom of cylinder 4 to the dome-cover B, thus permitting a full collection or massing of the heavy filterings therein, so that the pulp G' and F' is materially relieved of a great part thereof, thereby prolonging the current use of said pulp and increasing the working capacity of the filter to a considerable extent. The beer flows or advances from the cask ordinarily under a pressure of about fifteen pounds, half of which is the beer-pressure and the other half a forced pressure from an air-tank. This pressure is indicated by the upper gage D' on the entrance of the beer into the filter. In its passage through the filter the beer of course loses about two pounds or so of its pressure on account of the resistance offered by the filtering medium therein, which loss is duly indicated by the lower gage E', as are also any variations from time to time as the resistance is increased or diminished. When the filter is first started with fresh pulp therein, the pressure indicated by said lower gage is of course not so low as it is afterward when the pulp has become soaked and clogged with the filterings, which latter cause considerable back pressure. It will be seen that the pressure from the cask causes the pulp to spread uniformly in the spaces provided therefor between cylinders 1 and 2 and 3 and 4, respectively, and thus no uneven or thin spots or weak open places are left therein to permit filterings to pass through and otherwise affect the filtering operation. The pulp thus readily adapts itself equally thick everywhere and in all the desired directions intended to be occupied by it.

The telescopic arrangement of the strainer-cylinders and the pulp enables the ready removing or replacing of the set and said pulp in use when said set and pulp become clogged up and dirty, and another auxiliary clean set may be placed close at hand ready to be put in the casing or shell with fresh pulp at once, thus saving time materially, as the substitution is easily and quickly accomplished without taking the whole machine apart, and the filtering operation may continue with but slight interruption or delay. The telescopic feature also makes the machine very compact, and the spaces between the several cylinders 1 and 2 and 3 and 4 provide for the uniform and speedy changing and packing of the mass of filtering material therein.

The air-cocks and pressure-gages are supplied in ample number and mounted on the machine convenient for the operator to both readily handle and see them.

When once the lower short cylinders 1 and 2 are set in place and the vertical screws $g$ duly adjusted, so that said cylinders shall be firmly jointed, said screws $g$ need not be turned or released when the cylinders are removed unless larger or smaller ones are to be substituted for them. Lock-nuts O are provided on these jam or set screws to retain them in their duly-adjusted positions.

It will be seen that the gravity of the descending beer entering at the top of the filter very materially augments the filtering operation and in avoiding and relieving the cask of much back pressure. It also thus economizes in the use of the air-tank pressure or pressure from an auxiliary carbonizer often used by brewers having a large capacity and where a higher pressure is used.

I claim—

1. An apparatus for filtering beer, wine, and other liquids, the same being composed of an upright outer shell or casing having a valve-controlled inlet-pipe opening into its upper end or cap, and leading to a large central chamber, and a valve-controlled outlet-pipe leading from its lower end or bottom; a concentric series of two or more upright, perforated cylinders or screens having perforated, screen-bottoms and telescopically mounted within said shell or casing with an intervening space between each pair of internal strainer-cylinders and between the casing and the outermost internal strainer-cylinder; and a filling of wood-pulp or other suitable filtering material in one or more of said spaces between two or more of the strainer-cylinders; the whole being constructed, assembled, and adapted to operate whereby the beer or other liquid from the feeding or supply cask enters at the top and descends both under pressure and by gravity into and through said central chamber and the succeeding filtering screens and material, and thence from the open valve in the bottom of the shell to the receiving vessel, substantially as herein set forth.

2. In a filter, the combination of an outer shell or casing having a suitable bottom and a detachable cap or cover; a valve-controlled inlet-pipe opening into the upper end or into said cover, and leading to a large, central chamber or receptacle; a valve-controlled outlet-pipe leading from its lower end or from said bottom; a concentric series of two or more upright internal strainer-cylinders having screen-bottoms and telescopically mounted within said shell with an intervening space between the successive strainer-cylinders, and also between the shell and the outermost, internal strainer-cylinder; a filling of wood-pulp or other suitable filtering material packed between two or more of the strainer-cylinders; a flushing-cock leading from said inlet-pipe; a gage device surmounting the inlet-pipe and communicating with unfiltered liquid; a gage device mounted on the side of the shell and communicating with the filtered liquid; and a vertical series of air or pet cocks on the shell or outer casing communicating with the several internal chambers, substantially as herein set forth.

3. In a filter, the combination of an outer shell or casing having a suitable bottom and a detachable lid or cover; a valved inlet-pipe leading into its upper end or top; a valved outlet-pipe leading from its lower end or bottom; a concentric series of two or more upright internal strainer-cylinders having screen-bottoms, and telescopically mounted within said shell with an intervening space or chamber between the successive strainer-cylinders and also between the shell and the outermost, internal strainer-cylinder; a filling of wood-pulp or other suitable filtering material packed in the spaces between two or more of said strainer-cylinders; and a circular series of radial, shouldered resting and centering blocks in one or more of the telescopic strainer-cylinders; the whole being constructed, arranged, and adapted to operate, substantially as herein set forth.

4. In a filter, the combination with a pair of upright filtering screen-cylinders having suitable strainer-bottoms, and concentrically mounted one within the other, of a funnel-mouthed ring detachably fitting upon the outer cylinder, and a conical hood or guide-cap detachably fitting over the upper end of the inner cylinder, whereby the loose filtering material such as wood-pulp or the like may be conveniently filled and packed in the annulus or space provided therefor between the two cylinders, substantially as herein set forth.

In testimony of which invention I have hereunto set my hand.

CHARLES HOFF.

Witnesses:
 JOHN E. JONES,
 L. M. JONES.